(12) United States Patent
Niarfeix et al.

(10) Patent No.: US 7,367,714 B2
(45) Date of Patent: May 6, 2008

(54) INSTRUMENTED ROLLING BEARING

(75) Inventors: François Niarfeix, Cérelles (FR); Sylvain Chaussat, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 656 days.

(21) Appl. No.: 10/783,389

(22) Filed: Feb. 20, 2004

(65) Prior Publication Data

US 2004/0202392 A1 Oct. 14, 2004

(30) Foreign Application Priority Data

Feb. 26, 2003 (FR) ................................. 03 02363

(51) Int. Cl.
*F16C 19/52* (2006.01)

(52) U.S. Cl. ...................... 384/448; 384/517; 384/563

(58) Field of Classification Search ................ 384/448, 384/517, 518, 563
See application file for complete search history.

(56) References Cited

U.S. PATENT DOCUMENTS

| | | |
|---|---|---|
| 4,029,186 A | 6/1977 | De Gennes |
| 4,046,238 A | 9/1977 | Mendoza-Orozco |
| 4,319,220 A | 3/1982 | Pappas et al. |
| 4,478,595 A | 10/1984 | Hayakawa et al. |
| 4,601,374 A | 7/1986 | Ladin |
| 4,608,741 A | 9/1986 | Mallet |
| 4,641,523 A | 2/1987 | Andreasson |
| 4,699,530 A | 10/1987 | Satoh et al. |
| 4,815,867 A | 3/1989 | Ladin |
| 4,854,436 A | 8/1989 | Lassiaz et al. |
| 4,872,768 A | 10/1989 | Brandenstein et al. |
| 4,874,073 A | 10/1989 | Tagawa |
| 4,881,629 A | 11/1989 | Gay et al. |
| 4,946,295 A | 8/1990 | Hajzler |

(Continued)

FOREIGN PATENT DOCUMENTS

DE 42 28 988 3/1994

(Continued)

OTHER PUBLICATIONS

U.S. Appl. No. 10/551,167, filed Sep. 27, 2005, entitled "Portable Measuring Device for Use in Sport" to Franck, available in Private Pair.

(Continued)

*Primary Examiner*—William C. Joyce
(74) *Attorney, Agent, or Firm*—Meyertons, Hood, Kivlin, Kowert & Goetzel, P.C.; Eric B. Meyertons

(57) ABSTRACT

Instrumented rolling bearing device of the type including a non-rotating race, a rotating race, at least one row of rolling elements arranged between two raceways of the rotating and non-rotating races, and an assembly for detecting rotation parameters including a non-rotating sensor assembly and a rotating encoder, and an elastic member intended for axially prestressing the rolling bearing, retained axially on the sensor, the elastic member being of annular shape and having a diameter smaller than or equal to that of the outer race of the bearing, the elastic member including a supporting surface designed to be in contact with an element outside the bearing device in order to exert, directly or indirectly, by reaction, an axial force on the non-rotating race in a direction opposite to the detection assembly.

13 Claims, 4 Drawing Sheets

U.S. PATENT DOCUMENTS

| | | |
|---|---|---|
| 4,957,133 A | 9/1990 | Linz et al. |
| 5,008,647 A | 4/1991 | Brunt et al. |
| 5,018,384 A | 5/1991 | Hayashi et al. |
| 5,033,013 A | 7/1991 | Kato et al. |
| 5,051,693 A * | 9/1991 | Brauer .................. 324/207.22 |
| 5,264,790 A | 11/1993 | Moretti et al. |
| 5,372,435 A | 12/1994 | Genero et al. |
| 5,575,568 A | 11/1996 | Rigaux et al. |
| 5,592,401 A | 1/1997 | Kramer |
| 5,598,913 A | 2/1997 | Monahan et al. |
| 5,713,577 A | 2/1998 | Lannert et al. |
| 5,721,539 A | 2/1998 | Goetzl |
| 5,780,731 A | 7/1998 | Matsui et al. |
| 5,845,230 A | 12/1998 | Lamberson |
| 5,865,288 A | 2/1999 | Thomire et al. |
| 5,877,431 A | 3/1999 | Hirano |
| 6,011,491 A | 1/2000 | Goetzl |
| 6,013,007 A | 1/2000 | Root et al. |
| 6,035,990 A | 3/2000 | Peschke |
| 6,043,643 A | 3/2000 | Message et al. |
| 6,056,446 A | 5/2000 | Welter et al. |
| 6,109,624 A | 8/2000 | Message et al. |
| 6,160,480 A | 12/2000 | Su-yueh |
| 6,196,552 B1 | 3/2001 | Peterson et al. |
| 6,267,512 B1 | 7/2001 | Beghini et al. |
| 6,323,640 B1 | 11/2001 | Forestiero et al. |
| 6,338,576 B1 | 1/2002 | Girardin et al. |
| 6,415,900 B1 | 7/2002 | Lopez et al. |
| 6,539,336 B1 | 3/2003 | Vock et al. |
| 6,611,138 B2 | 8/2003 | Vasiloiu |
| 6,612,749 B2 | 9/2003 | Arnault et al. |
| 6,666,784 B1 | 12/2003 | Iwamoto et al. |
| 6,746,352 B1 | 6/2004 | Poiret et al. |
| 6,908,229 B2 | 6/2005 | Landrieve et al. |
| 2003/0002764 A1 | 1/2003 | Pflugner et al. |
| 2003/0007631 A1 | 1/2003 | Bolognesi et al. |
| 2004/0013334 A1 | 1/2004 | Landrieve et al. |
| 2004/0141669 A1 | 7/2004 | Landrieve et al. |
| 2004/0154895 A1 | 8/2004 | Thomire et al. |
| 2005/0008276 A1 | 1/2005 | Beghini et al. |
| 2005/0011717 A1 | 1/2005 | Arnault |
| 2005/0011718 A1 | 1/2005 | Arnault |
| 2005/0089255 A1 | 4/2005 | Debrailly et al. |
| 2005/0124447 A1 | 6/2005 | Message et al. |
| 2005/0165397 A1 | 7/2005 | Faus et al. |
| 2005/0235513 A1 | 10/2005 | Niarfeix |
| 2005/0265646 A1 | 12/2005 | Arnault |
| 2006/0011445 A1 | 1/2006 | Bussit et al. |
| 2006/0104558 A1 | 5/2006 | Gallion et al. |
| 2006/0227007 A1 | 10/2006 | Landrieve |
| 2007/0053622 A1 | 3/2007 | Gallion et al. |

FOREIGN PATENT DOCUMENTS

| | | |
|---|---|---|
| DE | 9418459 | 2/1995 |
| DE | 29708535 | 8/1997 |
| DE | 19637585 | 3/1998 |
| DE | 19809074 | 1/1999 |
| DE | 10011820 | 9/2001 |
| DE | 10148388 | 4/2003 |
| EP | 399855 | 11/1990 |
| EP | 0 511 105 | 10/1992 |
| EP | 0520853 | 12/1992 |
| EP | 0553716 | 8/1993 |
| EP | 806581 | 11/1997 |
| EP | 823267 | 2/1998 |
| EP | 0 930 505 | 7/1999 |
| EP | 930505 | 7/1999 |
| EP | 0 992 797 | 4/2000 |
| EP | 992797 | 4/2000 |
| EP | 1037051 | 9/2000 |
| EP | 1146244 | 10/2001 |
| EP | 1164358 | 12/2001 |
| FR | 2577291 | 8/1986 |
| FR | 2602872 | 2/1988 |
| FR | 2655735 | 6/1991 |
| FR | 2813644 | 3/2003 |
| GB | 1580301 | 12/1980 |
| GB | 2054084 | 2/1981 |
| GB | 2153082 | 8/1985 |
| GB | 2156082 | 10/1985 |
| WO | 9850709 | 11/1998 |
| WO | 0142809 | 6/2001 |
| WO | 02052280 | 7/2002 |
| WO | WO 02/052163 | 7/2002 |
| WO | WO 02/052280 | 7/2002 |
| WO | 03065051 | 8/2003 |
| WO | 2004005937 | 1/2004 |

OTHER PUBLICATIONS

U.S. Appl. No. 10/522,375, filed Jan. 18, 2005, entitled "Freewheel Bearing Device and Freewheel Pulley" to Girardin, available in Private Pair.
English translation of DE 10148388 (1 page).
English translation of DE 19637585 (1 page).
English translation of DE 29708535 (1 page).
English translation of EP 399855 (1 page).
Rapport D'Examen Preliminaire International for PCT/FR02/00359, Date d'achevement du present rapport Dec. 13, 2002 (6 pages).
Rapport D'Examen Preliminaire International for PCT/FR03/00264, Date d'achevement du present rapport Jul. 28, 2003 (5 pages).
Rapport D'Examen Preliminaire International for PCT/FR03/01985, Date d'achevement du present rapport Dec. 9, 2004 (7 pages).
Preliminary Search Report for FR 0208263, completed on Mar. 27, 2003 (2 pages).
Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.
International Search Report for PCT/FR 03/00264 mailed on May 28, 2003 (2 pages).
International Search Report for PCT/FR02/00359 mailed Jul. 3, 2002.
French Search Report for FR 0302363 mailed on Oct. 6, 2003.
European Search Report for EP 04 29 0379 mailed Jun. 4, 2004.
English translation of EP 823267 (1 page).
English translation of FR 2577291 (1 page).

* cited by examiner

&& # INSTRUMENTED ROLLING BEARING

BACKGROUND OF THE INVENTION

1. Field of the Invention

The present invention relates to the field of instrumented rolling bearings fitted with an assembly for detecting rotation parameters, such as angular position, direction of rotation, speed and acceleration. The invention relates more particularly to an instrumented rolling bearing comprising a sensor secured to a non-rotating race and an encoder secured to a rotating race.

2. Description of the Relevant Art

Instrumented rolling bearings are used, for example, for controlling synchronous electric motors. The indexing of the sensor makes it possible to know, in particular, the speed of rotation and the angular position of the poles of the rotor in relation to the poles of the stator.

Document EP-A-1037051 discloses an instrumented rolling bearing device in which an encoder member is secured to a shaft, a sensor unit being secured to a rotating race. The non-rotating race is mounted in a bore in a fixed part to allow an axial displacement relative to the fixed part, conical washers exerting an axial force on the non-rotating race in order to keep it in position.

Because such a device uses a plurality of prestressing washers that are independent of the rolling bearing and of the detection system, the motor maker must thus manage, handle and assemble a large number of components.

SUMMARY OF THE INVENTION

Described herein is an instrumented rolling bearing that is economical and easy to install in a machine for which it is intended, for example, in an electric motor.

The instrumented rolling bearing device, in one embodiment, is of the type including a non-rotating race, a rotating race, at least one row of rolling elements arranged between two raceways of the rotating and non-rotating races, and an assembly for detecting rotation parameters comprising a non-rotating sensor assembly and a rotating encoder. The device includes an elastic member intended for axially prestressing the rolling bearing, retained axially on the sensor assembly. The elastic member is of an annular shape and has a diameter smaller than or equal to that of the outer race of the bearing. The elastic member includes a supporting surface designed to be in contact with an element outside the device in order to exert, directly or indirectly, by reaction, an axial force on the non-rotating race in a direction opposite to the detection assembly.

The axial retention of the elastic member on the detection assembly prior to mounting the detection assembly on the rolling bearing for which it is intended makes it possible to reduce the number of components to be procured and to be fitted. Manufacturing errors resulting from forgetting the elastic member are thus avoided. The detection assembly has a small radial bulk because of the elastic member, the outside diameter of which is smaller than or equal to that of the outer race of the bearing. The axial force may be exerted by direct contact of the elastic member on the non-rotating race. Alternatively, the axial force may be exerted by way of another element, for example a printed-circuit board.

In one embodiment, the elastic member is a corrugated washer. In another embodiment, the elastic member is a conical washer. In one embodiment, the elastic member is a washer provided with elastic tongues.

Advantageously, the sensor assembly includes a body or sensor unit fitted with means for retaining the elastic member. The retaining means includes at least one finger.

In one embodiment, the sensor assembly includes a printed circuit and a sensor element supported by the printed circuit, the elastic member being in contact with the printed circuit on an opposite side to the sensor element. The elastic member may be arranged axially between the printed circuit and means for retaining the elastic member forming part of the sensor assembly, the printed circuit taking part in transmitting the axial force between the non-rotating race and the elastic member. Apart from its radial compactness, the device may have satisfactory axial compactness.

In one embodiment, the rolling elements transmit said axial prestress from one race of the rolling bearing to the other.

In one embodiment, the elastic member for axially prestressing the rolling bearing pushes the non-rotating race away from said assembly for detecting rotation parameters.

Also described is an assembly for detecting rotation parameters including a non-rotating sensor assembly and a rotating encoder, and including an axially prestressing elastic member retained axially on the sensor assembly. The elastic member is of annular shape and has a diameter smaller than or equal to that of the sensor assembly. The elastic member comprises a supporting surface designed to be in contact with an element outside the device in order to exert, directly or indirectly, by reaction, an axial force on the detection assembly.

In one embodiment, the elastic member includes a washer.

Also described is an electric motor comprising a rotor, a stator, a rolling bearing and an instrumented rolling bearing device comprising a non-rotating race, a rotating race, at least one row of rolling elements arranged between two raceways of the rotating and non-rotating races, an assembly for detecting rotation parameters comprising a non-rotating sensor assembly and a rotating encoder, and an elastic member intended for axially prestressing said rolling bearing. The elastic member is retained axially on a sensor assembly while at the same time having an annular shape and a diameter smaller than or equal to that of an outer race of the rolling bearing. The elastic member includes a supporting surface designed to be in contact with an element outside the device in order to exert, directly or indirectly, by reaction, an axial force on the non-rotating race in a direction opposite to the detection assembly.

Advantageously, the elastic member is arranged axially between the sensor assembly and non-rotating part of the motor, for example a part of the casing or an added part coupled to the casing.

BRIEF DESCRIPTION OF THE DRAWINGS

Other objects and advantages of the invention will become apparent upon reading the following detailed description and upon reference to the accompanying drawings in which.

Figure 1:
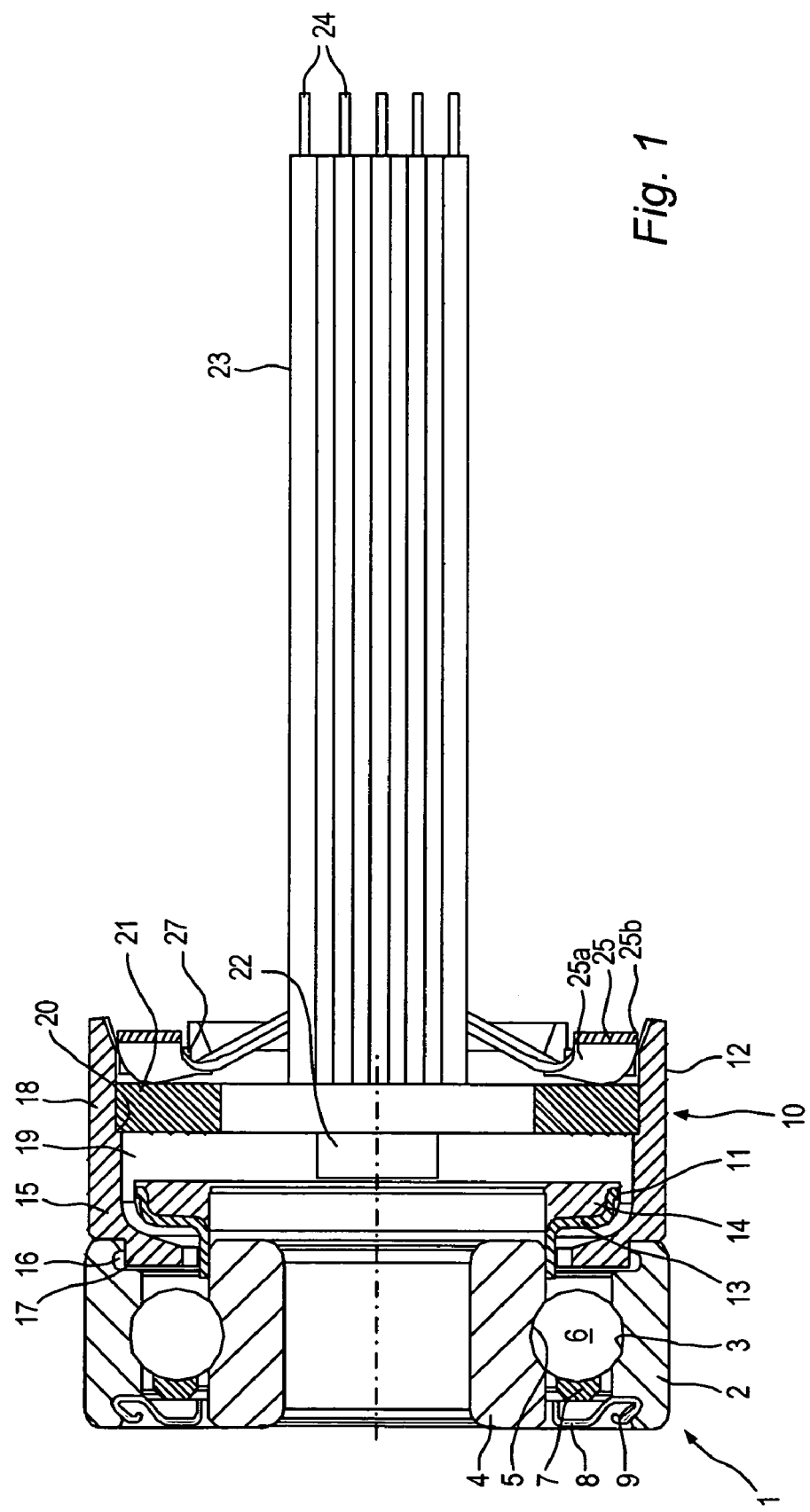
FIG. 1 depicts an axial cross-section view of an instrumented rolling bearing.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, the instrumented rolling bearing, denoted in its entirety by reference 1, is designed to be mounted on the end of a rotating shaft of an electric motor (not shown). The bearing 1 includes an outer race 2 provided with a raceway 3, an inner race 4 provided with a raceway 5, a row of rolling elements 6, in this case balls, arranged between the raceways 3 and 5, a cage 7 for maintaining the circumferential spacing between the rolling elements 5, and a seal 8 fitted in a groove 9 in the outer race 2 on one side of the row of rolling elements 6. The bearing 1 is, furthermore, equipped with a detection assembly 10 composed of an encoder 11 and of a sensor assembly 12.

The encoder 11 comprises an annular support 13 having an S-shaped cross section, with a cylindrical portion push-fitted onto an outer bearing surface of the rotating inner race 4, an outwardly directed radial portion and another cylindrical portion directed away from the rolling elements 6, and an active part 14 in the form of a multi-pole ring made of plastoferrite or of elastoferrite overmolded onto the support 13, the active part 14 being arranged axially so as to project relative to the radial frontal surfaces bounding the outer race 2 and inner race 4 of the bearing 1.

The sensor assembly 12 includes a sensor unit 15 made of synthetic material and rigidly secured to the outer race 2. The sensor unit 15 comes into contact with the frontal radial surface of the outer race 2 on the opposite side of the seal 8 and is fixed in a groove 16 that is symmetrical to the groove 9 relative to a plane passing through the center of the rolling elements 6. The sensor unit 15 includes a substantially radial part 17 arranged axially between the rolling elements 6 and the radial part of the support 13 of the encoder 11, and radially between the groove 16 and the cylindrical part of the support 13 push-fitted onto the outer bearing surface of the inner race 4, and a substantially tubular part 18 having an outside diameter that is slightly smaller than the outside diameter of the outer race 2 and extending axially away from the rolling elements 6. The tubular part 18 includes a bore 19 provided with a shoulder 20. The tubular part 18 radially surrounds the active part 14 of the encoder 11.

The sensor assembly 12 also includes a printed-circuit or integrated-circuit board 21 of annular shape that is fitted into the bore 19 until it comes into contact with the shoulder 20 arranged approximately at the center of the tubular part 18, one or more sensor elements 22 supported by the board 21 on the side on which the encoder 11 is, and a ribbon connector 23. The board 21 has a bore allowing a shaft of the motor to pass through. The sensor element or elements 22 may be of the Hall-effect type. The ribbon connector 23 is connected to the board 21 on the opposite side to the sensor elements 22 and comprises a plurality of conductors 24 that can transmit power and/or electrical signals. The sensor element or elements 22 are arranged with a slight axial gap with respect to the active part 14 of the encoder 11.

Figure 2:
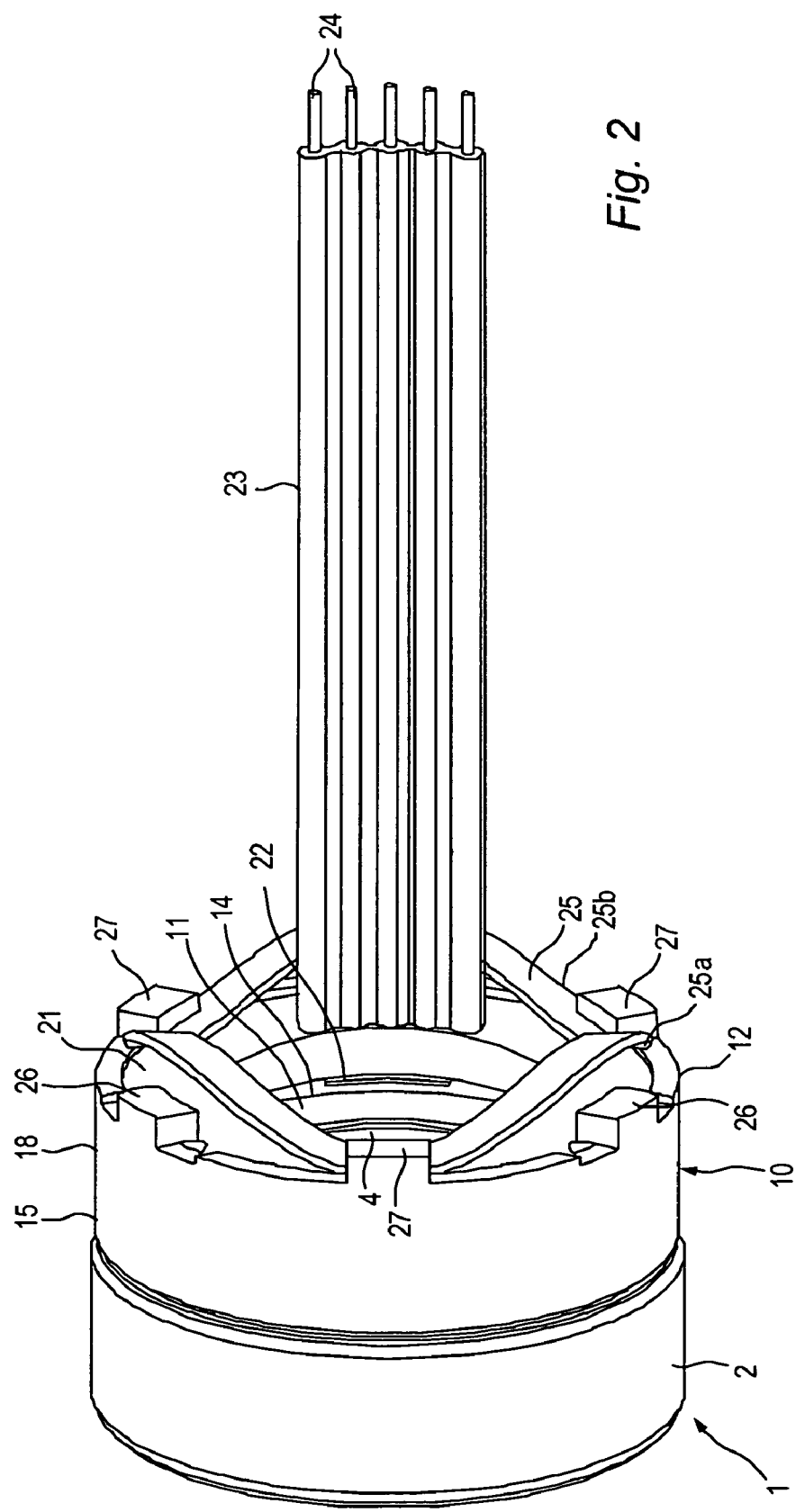
FIG. 2 depicts a perspective view of the rolling bearing of FIG. 1.

As shown in FIG. 2, the bearing 1 additionally includes an axially prestressing member 25, here taking the form of a corrugated washer, this member being arranged in the bore 19 and being in contact with the board 21 by way of a surface 25a on the same side as the ribbon connector 23. Formed at the free end of the tubular part 18 of the sensor unit 15 are a plurality of fingers, of which three fingers 26 ensure that the board 21 is retained axially such that it is immobilized axially between the shoulder 20 and the fingers 26. The fingers 26 project radially inward with respect to the bore 19.

Also provided are three other retaining fingers 27, likewise distributed circumferentially, for retaining the axially prestressing member 25, these likewise projecting inward with respect to the bore 19. The retaining fingers 27 are in contact with a surface 25b of the axially prestressing member 25 on the opposite side to the surface 25a. The axially prestressing member 25 forms, with the bearing 1, a pre-assembled subassembly that may be assembled economically with the other constituents of an electric motor.

Figure 3:
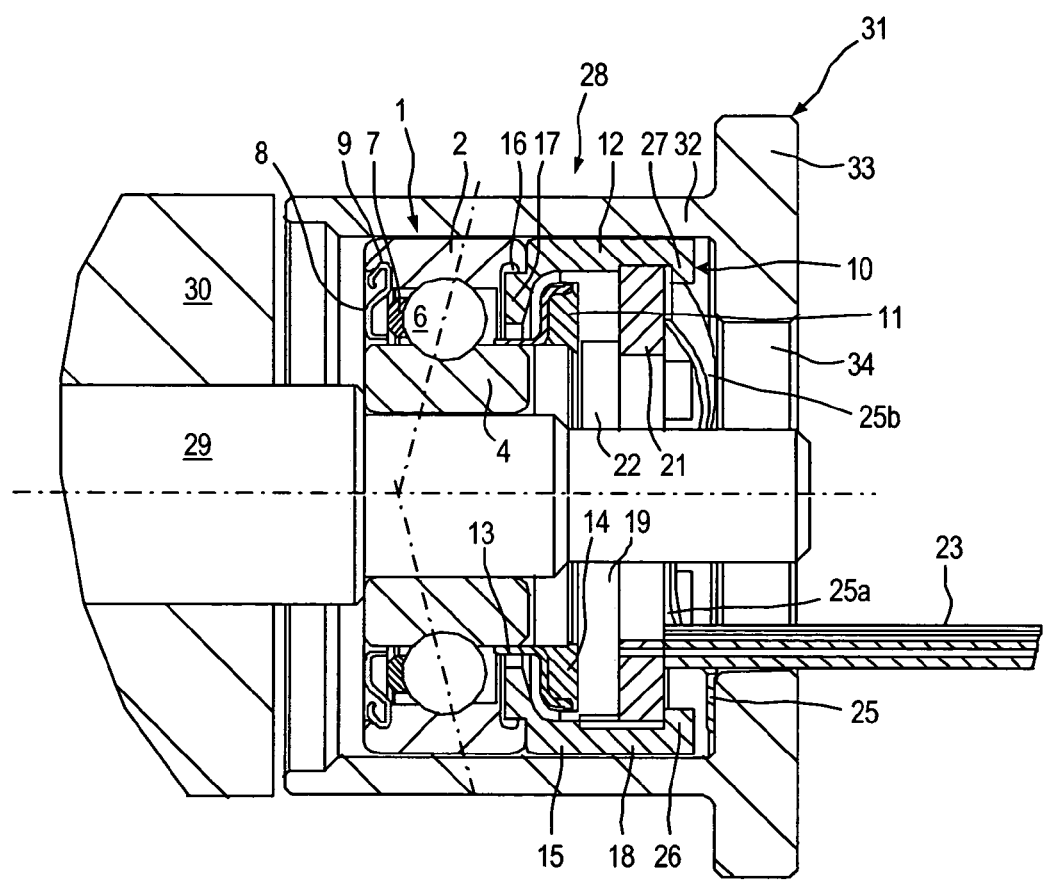
FIG. 3 depicts an axial cross-section view of an electric motor.

As can be seen in FIG. 3, the instrumented rolling bearing 1 is mounted in a motor 28 of which only an end part is shown. The bore of the inner race 4 is fitted tightly on a shaft 29 secured to a rotor 30. The outer race 2 is fitted in a motor casing 31 generally including a plurality of elements and of which only part is shown. The outer race 2 is installed with a sliding fit in a tubular portion 32 of the casing 31. The casing 31 also has a radial part 33 that is arranged at the opposite end of the tubular part 32 to the rotor 30 and has an annular shape with a bore 34 through which the end of the shaft 29 and the ribbon connector 24 pass. The surface 25b of the axially prestressing member 25 bears on the inner radial face of the radial part 33 of the casing 31. In this way, the axially prestressing member 25 tends to push the outer race 2 toward the rotor 30 by way of the board 21 and of the sensor unit 15, and this allows the bearing 1 to be axially preloaded.

Figure 4:
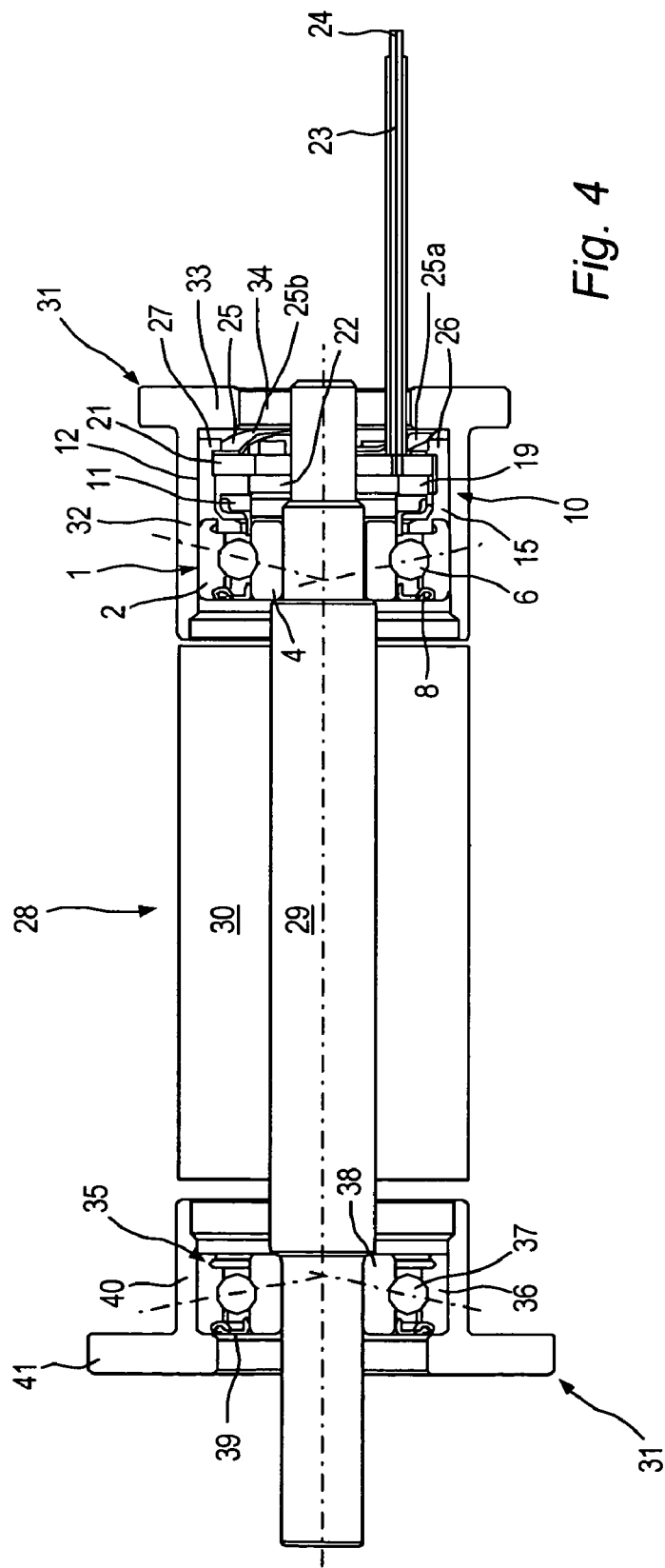
FIG. 4 depicts an alternate axial section of the electric motor of FIG. 3.

In FIG. 4, the motor 28 is partially represented schematically. The opposite end of the shaft 29 to the rolling bearing 1 is equipped with a non-instrumented conventional type of rolling bearing 35 with a row of rolling elements, comprising an outer race 36, a row of rolling elements 37, in this case balls, an inner race 38 secured to the shaft 29 with a tight fit, and a sealing element 39 secured to the outer race 36 and forming a narrow passage with the inner race 38. The outer race 36 is mounted in the casing 31 of the motor, which includes a tubular part 40 and a radial part 41 arranged at the opposite end of the tubular part 40 to the rotor 30, leaving a central passage open through which the shaft 29 projects. The outer race 36 of the rolling bearing 35 may be force-fitted into the tubular part 40. Of course, the various parts 32, 33, 40 and 41 of the casing 31 are firmly connected together in a way that has not been shown.

The axial prestress exerted by the axially prestressing member 25 is transmitted from the outer race 2 of the rolling bearing 1 to the inner race 4 by way of the rolling elements 6, then to the shaft 29, to the inner race 38 of the rolling bearing 35, to the rolling elements 37 and to the outer race 36. It will be understood that the presence of a single axially prestressing member 25 allows the rolling bearing 1 and the rolling bearing 35 to be axially preloaded while accommodating different expansions of the shaft, generally made of steel, and of the casing, generally based on aluminum, the rolling bearing 1 being able to slide axially with respect to the casing supporting it.

The rolling bearing 1 is assembled as follows. The board 21 is positioned in the bore 19 of the sensor unit 15 until it comes into abutment with the shoulder 20. The axially prestressing member 25 is then positioned in the bore 19 against the board 21. Studs emanating from the free end of the tubular part 18 of the sensor 15 are then deformed by heating in order to form the retaining fingers 26 and 27 that determine the final position of, and axially retain, the board 21 and the axially prestressing member 25.

The axially retaining member 25 thus bears against a part of the motor outside the rolling bearing and exerts, by reaction, an axial prestress on the non-rotating race, the rolling elements and the rotating race. The rolling bearing is preloaded axially. In the embodiment shown, the preload is transmitted by the board 21 and the sensor unit 15; however, it is also possible to provide direct contact of the axially prestressing member 25 with the sensor unit 15 or, alternatively, with the non-rotating race.

Of course, it would be possible to provide a rotating outer race and a non-rotating inner race according to the machine for which the rolling bearing is intended. The expressions "rotating" and "non-rotating" are to be understood in relative terms.

The assembly thus obtained is particularly compact, it may be transported and handled with complete safety without any risk of loss of the elastic washer. The motor manufacturer has one less component to procure, manage and fit. The assembly may be fitted in the motor particularly easily without requiring any special precautions. There are thus provided, with a single rolling bearing assembly, the bearing function, an electronic detection function, for example speed detection or angular-position detection, and the mechanical function of axially prestressing the rolling bearings of the motor.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. An instrumented rolling bearing device comprising:
    a non-rotating race provided with a raceway;
    a rotating race provided with a raceway;
    at least one row of rolling elements arranged between said raceways of the rotating and non-rotating races;
    an assembly for detecting rotation parameters comprising a non-rotating sensor assembly and a rotating encoder; and
    an elastic member intended for axially prestressing the rolling bearing, retained axially on the sensor assembly, the elastic member being of annular shape and having an outer diameter smaller than or equal to that of the outer race of the bearing, the elastic member comprising a supporting surface designed to be in contact with an element outside said bearing device in order to exert, directly or indirectly, by reaction from the above element outside said device, an axial force on the non-rotating race in a direction opposite to the detection assembly;
    wherein a portion of the non-rotating sensor assembly axially retains said elastic member on the sensor assembly.

2. The device as claimed in claim 1, in which the elastic member is a corrugated washer.

3. The device as claimed in claim 2, in which the sensor assembly comprises a body fitted with means for retaining the elastic member.

4. The device as claimed in claim 3, in which said retaining means comprise at least one finger.

5. The device as claimed in claim 2, in which the sensor assembly comprises a printed circuit and at least one sensor element supported by the printed circuit, the elastic member being in contact with the printed circuit on an opposite side to the sensor element.

6. The device as claimed in claim 1, in which the sensor assembly comprises a body fitted with means for retaining the elastic member.

7. The device as claimed in claim 6, in which said retaining means comprise at least one finger.

8. The device as claimed in claim 1, in which the sensor assembly comprises a printed circuit and at least one sensor element supported by the printed circuit, the elastic member being in contact with the printed circuit on an opposite side to the sensor element.

9. The device as claimed in claim 8, in which the elastic member is arranged axially between the printed circuit and means for retaining said elastic member, forming part of the sensor assembly.

10. The device as claimed in claim 9, in which the rolling elements transmit said axial prestress.

11. The device as claimed in claim 8, in which the rolling elements transmit said axial prestress.

12. The device as claimed in claim 1, in which the rolling elements transmit said axial prestress.

13. The device as claimed in claim 1, in which the elastic member for axially prestressing the rolling bearing pushes the non-rotating race away from said assembly for detecting rotation parameters.

* * * * *